(No Model.)

J. C. GARROOD.
VELOCIPEDE.

No. 348,276. Patented Aug. 31, 1886.

WITNESSES
W. W. Fall
A. Watson

INVENTOR
John C. Garrood

UNITED STATES PATENT OFFICE.

JOHN C. GARROOD, OF BOSTON, MASSACHUSETTS.

VELOCIPEDE.

SPECIFICATION forming part of Letters Patent No. 348,276, dated August 31, 1886.

Application filed March 15, 1886. Serial No. 195,339. (No model.)

*To all whom it may concern:*

Be it known that I, JOHN COUSINS GARROOD, a subject of the Queen of Great Britain, residing at Boston, in the county of Suffolk and State of Massachusetts, have invented new and useful Improvements in Bearings for Velocipedes, of which the following is a specification.

My invention relates more particularly to velocipedes known as the "American Star" bicycle, and tricycles driven by similar mechanism, but do not confine myself to such use.

The object of my invention is to reduce the friction upon the bearings of the wheel and driving mechanism of velocipedes of this description, and also to provide for a ready and simple adjustment of the same, consequently making the machine run easier, as well as noiselessly, which enhances the pleasure and comfort of the rider. To obtain this result I introduce spherical balls in such a manner that they do not increase the external diameter of the clutch-box, nor increase the width of the machine, nor alter the general arrangement of the internal mechanism.

Figure 1:
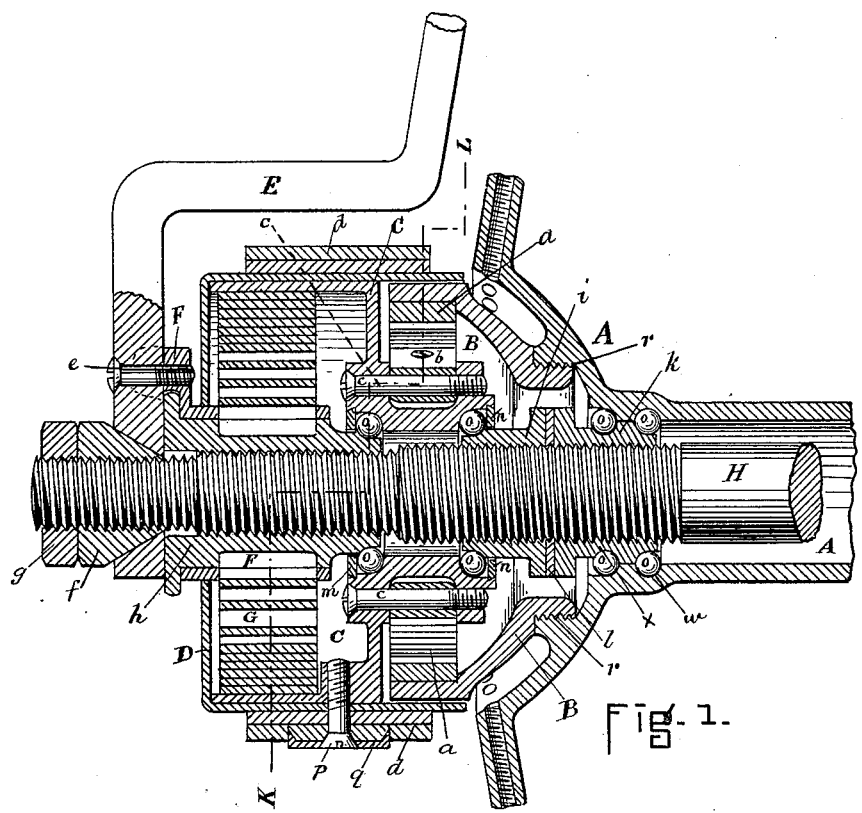
Figure 2:
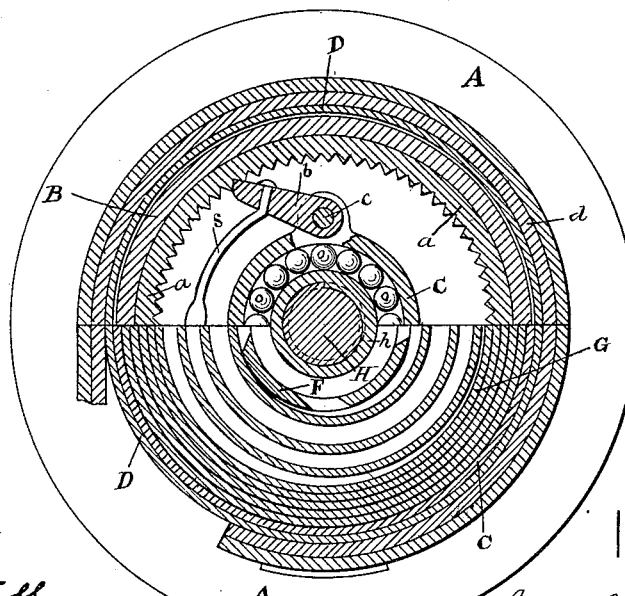

My invention is represented in the accompanying drawings, in which Figure 1 is a rear sectional elevation of the left-hand end only (the other, right-hand, end being an exact counterpart) of a bicycle hub and driving mechanism. Fig. 2 is a cross-section drawn on the zigzag line K L, Fig. 1.

Similar letters refer to similar parts throughout both the views.

The hub A, to which the spokes of the wheel are screwed or otherwise attached, is preferably made of one solid piece of steel, as in this invention, but may be made of other metal, and steel bushes inserted for the double-row ball-bearings, as patented by me in the United States and England March 18, 1884. The toothed steel ring $a$ is securely attached in the usual way to the cupped disk B, and B is screwed into the hub A at $r$, also in the usual way; but B may be made solid with the hub A, if required. The circular box C, containing the coiled spring G inside the outer end, has a boss upon the inner end, to which boss is attached, in the usual way, the pawls $b$ by the screwed bolts $c$, and at each end of the boss inside is an annular (about quadrantal in cross-section) groove to receive the balls $o$, the washers $m$ and $n$ keeping them in their places, so they cannot fall out when the clutch-box C is taken off the axle H. The coiled spring G is attached to the box C by a hook turned upon the external end, and hooking upon a piece of thin metal riveted over a slot made in the periphery of the box C. The internal end of the spring G is also hooked, which hook springs into any one of the four slots in the sleeve or collet F, as required. This spring serves the purpose to recover the clutch-box C, ready for action again. The sleeve or collet F has a portion of a flange left upon it, in order to secure it to the frame E by the screw $e$, which prevents it from turning; and as a further security there are two projections upon the said portion of flange, and the frame E fits between them, so that should the screw $e$ come out or be lost the sleeve or collet F could not revolve. Consequently the spring G would be constantly kept in action. The box C, as in this invention, is made of one solid piece of steel, and the box is hardened and tempered where the balls $o$ revolve, but may be made of other metal, and hardened and tempered steel bushes inserted for the balls to revolve in. The thin metallic box or case D fits the box C fairly tight, and extends beyond C far enough to cover the parallel part of the cupped die B, but not touching it, acting as a dust-excluder, and also carrying the driving double strap $d$. The driving double strap $d$ is attached at one end to the clutch-box by the plate $q$ and screw $p$, the other end of it being attached to the lever of the machine. The axle H has three different-diameter threads upon it, to facilitate the screwing on of the sleeves $h$ $i$ $k$. The adjustable grooved internally-threaded sleeve $k$ is hexagonal upon the outer end for a wrench to turn it, when required. The washer $l$ has a teat projecting inside its hole, and fits a corresponding groove in the axle H, which teat prevents the washer from turning round. The sleeve $i$ is also hexagonal upon the inner end, that a wrench may turn it, and at the outer end has nearly a quadrantal groove to receive the balls $o$. The sleeve $h$ has a milled-edge flange upon the outer end for adjustment by the fingers, and at the inside end a nearly quadrantal groove to receive the balls $o$. The coned nut $f$ fits in a corresponding coned hole in the frame E, and serves to secure firmly the sleeve *h* to the frame, which keeps it from any motion. The lock-nut *g* is a further security. The bent steel spring-wire *s*, secured to the pawl *b*, is flattened at the end, which flattened end rubs against the cupped disk B, when B, with the hub A, revolves, the friction causing it to stand clear of the toothed ring *a*, and when the clutch-box is put in motion it brings the pawl into action upon the teeth, and it is there retained while the power is applied. The usual friction-clutch as now applied may be used, and if so would be put upon the sleeve *i*.

When this improvement is all apart, ready to put together, and to facilitate the operation, the following order of proceeding must be observed: The pawls *b* would be secured to the boss of the box C by the screws *c*. The balls *o o* will then be inserted, and the ends of the boss (being left soft at the extreme edge) are riveted over the washers to retain them and the balls in their places, (or the washers *m* and *n* may be secured by small screws.) The spring G is next inserted and hooked where the provision is made for it. The case D is then put over the box C, and the screw *p* is temporarily inserted. The sleeve or collet F must now be passed through the hole of the case D, provided for it, and through the inside coil of the spring G, and revolved until the hook is caught in one of the openings in the collet. The clutch-box is now completed. The sleeve *k* will now be screwed upon the axle H, somewhere near its proper position, lay the wheel down upon its side and pass the axle through the hub A, nearly up to the sleeve, put the balls *o* in the groove *w*, lower the axle enough to put the balls *o* in the groove *x* of the sleeve *i*, lower the axle as far as the balls will allow it to go, secure the axle in its place temporarily, turn the wheel over, put in the balls for the lower row, screw on the sleeves just far enough to get in the second row of balls. Then screw the sleeve home and adjust, next put on the washer *l* and sleeve *i*, screwing *i* tightly against the washer *l* and sleeve *k*. (The usual friction-clutch, if used, would now be put on.) The pawl or clutch-box C, as previously put together, is next put on, after screwing B in its place tightly. The sleeve *h* is now screwed upon the axle, passing right through the collet F, until it stops at the balls *o*. Repeat the above operations upon the other side of the wheel. Then all is ready for putting the wheel into the frame of the machine. The frame is sprung open wide enough to pass over the ends of the axle, the nuts *f* and *g* are screwed on, the screws *e* passed through the frame and screwed into the sleeves or collets F tightly, the sleeve *h* is screwed up until the clutch-box is nicely adjusted, the coned nut *f* is screwed up tightly, and *g* is also screwed up tightly, as a further security. The screw *p* is now withdrawn, and the strap put on and screwed up tightly, the other end attached to the lever of the velocipede, and it is then ready for use.

I am aware that the idea of ball-bearings applied to this class of velocipede is not new, I therefore do not claim them, broadly; but What I do claim as my invention, and desire to secure by Letters Patent, is—

1. The combination, in bearings for velocipedes, of the sleeves *i*, washers *l*, sleeves *k*, axle H, balls *o o*, and hub A, all substantially as set forth.

2. In bearings for velocipedes, the combination of the clutch-boxes C, balls *o o*, washers *m* and *n*, sleeves *i*, washers *l*, sleeves *k*, axle H, balls *o o*, and hub A, as set forth.

3. In bearings for velocipedes, the combination of the frames E, collets F, sleeves *h*, clutch-boxes C, balls *o o*, sleeves *i*, washers *l*, sleeves *k*, axle H, balls *o o*, and hub A, for the purpose specified.

4. The combination, in bearings for velocipedes, of the frames E, collets F, sleeves *h*, clutch-boxes C, balls *o o*, and sleeves *i*, as set forth.

5. In bearings for velocipedes, the combination of the lock-nuts *g*, coned nuts *f*, frames E, screws *e*, collets F, sleeves *h*, springs G, cases D, boxes C, balls *o o*, pawls *b*, sleeves *i*, washers *l*, sleeves *k*, balls *o o*, axle H, and hub A, all substantially as set forth.

JOHN C. GARROOD.

Witnesses:
W. W. STALL,
A. WATSON.